Figure 1:
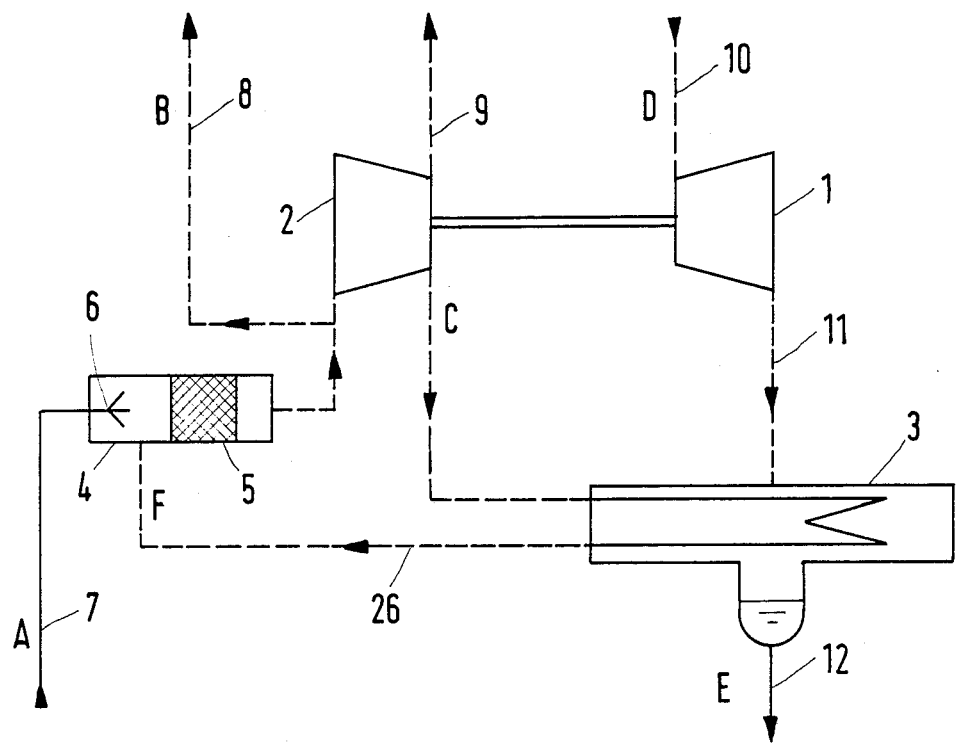

United States Patent [19]

Mandrin

[11] Patent Number: 4,716,737
[45] Date of Patent: Jan. 5, 1988

[54] APPARATUS AND PROCESS FOR VAPORIZING A LIQUIFIED HYDROCARBON

[75] Inventor: Charles Mandrin, Winterthur, Switzerland

[73] Assignee: Sulzer Brothers Limited, Winterthur, Switzerland

[21] Appl. No.: 26,665

[22] Filed: Mar. 17, 1987

[30] Foreign Application Priority Data

Mar. 20, 1986 [CH] Switzerland .................. 01115/86

[51] Int. Cl.⁴ .............................................. F17C 7/02
[52] U.S. Cl. ................................ 62/52; 60/651; 60/671; 62/87
[58] Field of Search .................. 62/52, 87, 86, 88; 60/651, 671

[56] References Cited

U.S. PATENT DOCUMENTS

| | | | |
|---|---|---|---|
| 3,154,928 | 11/1964 | Harmens | 62/87 |
| 3,209,552 | 10/1965 | Garrett | 62/87 |
| 3,266,261 | 8/1966 | Anderson | 62/52 |
| 3,846,994 | 11/1974 | Reid | 62/87 |
| 3,992,891 | 11/1976 | Pocrnja | 62/87 |
| 4,231,226 | 11/1980 | Griepentrog | 62/52 |
| 4,399,659 | 8/1983 | Strigl | 62/52 |

*Primary Examiner*—Ronald C. Capossela
*Attorney, Agent, or Firm*—Kenyon & Kenyon

[57] ABSTRACT

A liquified hydrocarbon is vaporized in the installation by being brought into direct contact with heated compressed hydrocarbon in a heat exchanger. The hydrocarbon is compressed in a compressor (2), which is driven by a steam turbine (1). To heat the compressed hydrocarbon, the hydrocarbon is brought into heat exchange with the waste steam from the steam turbine, in the process of which the waste steam condenses. The product can be withdrawn before or after the compressor (2).

19 Claims, 6 Drawing Figures

APPARATUS AND PROCESS FOR VAPORIZING A LIQUIFIED HYDROCARBON

This invention relates to an apparatus and process for vaporizing a liquified hydrocarbon.

Heretofore, a relatively large number of techniques have been known for supplying the energy required for vaporizing a liquified hydrocarbon such as a liquified natural gas for the purpose of transportation. For example, it has been known to utilize sea water as a source of heat for vaporizing liquid natural gas which is transported on a tanker. Generally, in this process sea water trickles down over the surface of finned pipes of heat exchangers through which the liquid natural gas flows in order to vaporize the liquid natural gas. However, this process has several disadvantages. First, the required water quantity is very large because sea water can only be cooled to approximately 4° C. This requires a rather large installation which on board ships presents particular difficulties. Second, the construction of these installations requires the use of specific expensive materials in order to reduce the risk of corrosion from the sea water.

The use of submerged combustion burners have also been known for vaporizing liquid natural gas. Generally, these burners consist essentially of an open water reservoir and a tower as well as a gas burner and a ventilator in the tower and a cooling coil in the reservoir in which the liquid natural gas may vaporize. An installation of this nature also has significant disadvantages. In particular, a considerable size is required because of the required water level. In addition, the installation must be constructed of stainless steel because of the high corrosive nature of the carbon dioxide-saturated water. Still further, such installations should not require open flames. Where submerged combustion burners are used, potential flashbacks may occur through the ventilator during power failure.

Accordingly, it is an object of the invention to be able to vaporize a liquified hydrocarbon in a relatively simple and reliable manner.

It is another object of the invention to provide an economical technique for vaporizing liquified hydrocarbon.

It is another object of the invention to provide a compact apparatus for the vaporization of a liquified hydrocarbon.

It is another object of the invention to reduce the risk of explosion in an apparatus for the vaporization of a hydrocarbon.

It is another object of the invention to permit the use of a relatively simple and economical apparatus for vaporizing liquified hydrocarbon on a steam driven tanker.

Of note, the liquified hydrocarbon which can be processed in accordance with the invention includes, in particular, natural gases, but also propane, butane and mixtures of light hydrocarbons called LPG (liquid pretroleum gas).

Briefly, the invention provides an apparatus for vaporizing a liquified hydrocarbon which comprises a heat exchanger, a conduit for delivering a flow of liquified hydrocarbon into the heat exchanger and means for delivering a vaporized flow of the hydrocarbon into the heat exchanger. In addition, a means is provided in the heat exchanger for mixing the delivered flows of liquified hydrocarbons and vaporized hydrocarbon for vaporization of the liquified hydrocarbon. In addition, the apparatus includes a compressor which is connected to the heat exchanger in order to receive and compress the vaporized flow of hydrocarbon as well as a heating means which is connected to and between the compressor and the heat exchanger for heating a flow of compressed hydrocarbon from the compressor for re-cycling to the heat exchanger.

The invention also provides a process for vaporizing a liquified hydrocarbon which includes the steps of heating a flow of liquified hydrocarbon with a flow of vaporized hydrocarbon in direct heat exchange relation to generate a vaporized flow of hydrocarbon compressing at least a part of the vaporized flow of hydrocarbon, heating the compressed flow of hydrocarbon in an indirect heat exchange relation to generate a flow of vaporized hydrocarbon and thereafter, re-cycling the indirectly heated flow of vaporized hydrocarbon into the flow of liquified hydrocarbon.

Various embodiments of the apparatus for performing the process and variations thereof may be employed.

In one embodiment, the heating means for indirectly heating the compressed hydrocarbon includes a second heat exchanger for receiving a flow of the compressed hydrocarbon and a thermal machine, such as a turbine for delivering a flow of heat conducting medium, such as steam, to the second heat exchanger for indirect heat exchange with the flow of compressed hydrocarbon in order to generate the vaporized flow of hydrocarbon for re-cycling purposes.

In a second embodiment, the heating means may further include a heat exchanger for preheating a flow of compressed hydrocarbon from the compressor prior to delivery to the heat exchanger of the heating means. In this case, waste heat from the heat exchanger of the heating means may be used for preheating the flow of compressed hydrocarbon.

In another embodiment, the flow of compressed hydrocarbon may be heated in a direct heat exchange and then expanded prior to re-cycling.

In still another embodiment, the flow of liquified hydrocarbon can be heated in at least two stages arranged in series in a direct heat exchange relation with a flow of vaporized hydrocarbon. In this case, each generated flow of vaporized hydrocarbon can then be compressed and heated for re-cycling purposes.

In another embodiment, the apparatus can be constructed with valve means so as to selectively connect the compressor to a liquified gas pipe line, for example, for operating the apparatus solely to compress the liquified gas in the pipe line. In such an embodiment, valve means are provided for selectively connecting the heat exchanger and heating means to the compressor.

In all of the various embodiments, suitable means are provided for withdrawing a product, i.e. vaporized hydrocarbon, for various purposes. In this respect, the product may be withdrawn upstream and/or downstream of the compressor.

The apparatus and process are particularly suitable for steam ships. However, the apparatus and process may be equally used on tankers with diesel engines or on land.

The apparatus provides a relatively small and easily dismantled vaporization installation which can be used on a tanker anchored on the high seas without the requirement of defined water levels. Further, the process permits an economical and cost-effective operation of the installation. In this regard, note is made that the construction of a gas-proof harbor represents an exceedingly uneconomical undertaking.

The invention further permits the vaporization apparatus to be mounted above a liquid gas storage so that the storage is readily accessible for purposes of inspection. For normal operation, no water is required.

When using the invention on steam tankers a significant advantage is present in that heat sources in the form of the already present steam boilers are available. For example during operation of the vaporization of the apparatus, the turbines need not operate and the steam needs to be available only for on-board equipment, for example, such as generators for the power supply, pump drive and the like.

Figure 2:
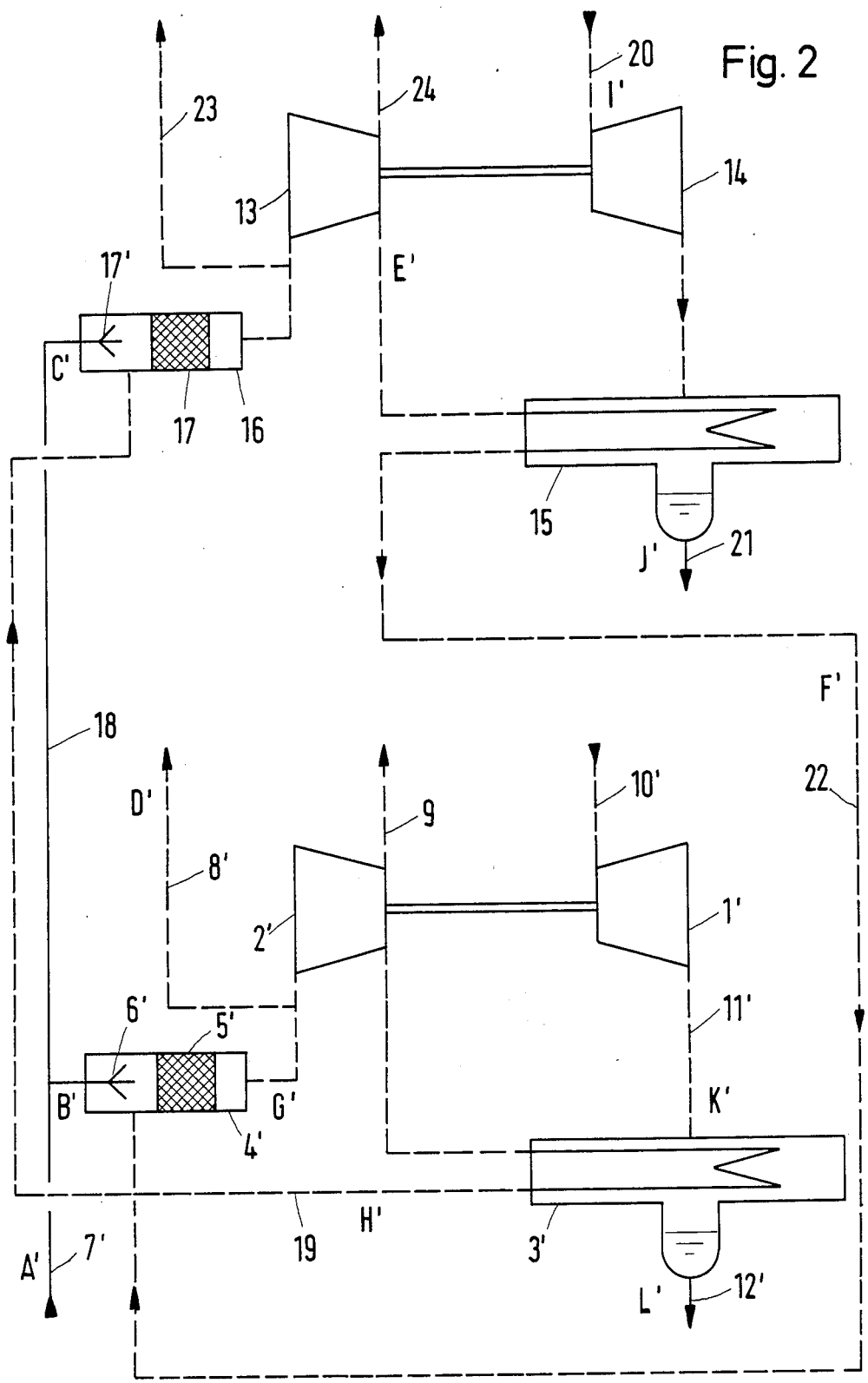
Figure 3:
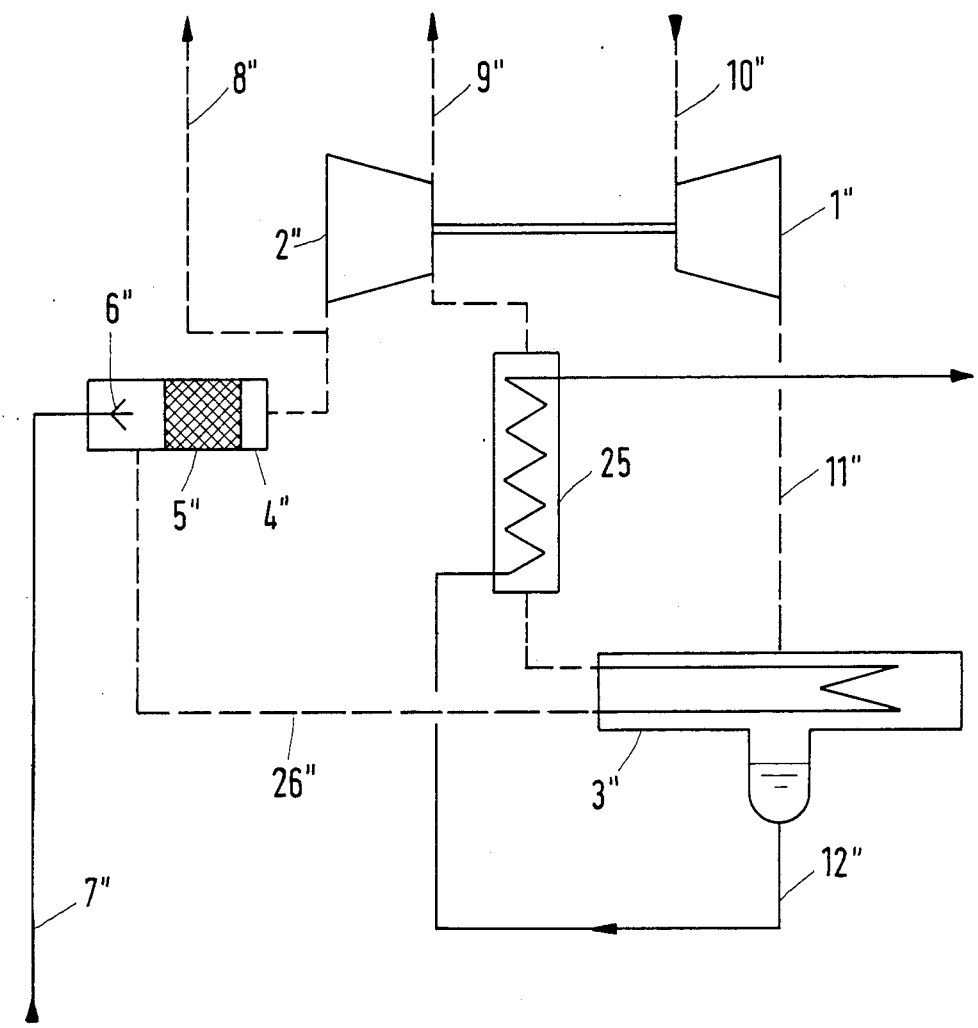
Figure 4:
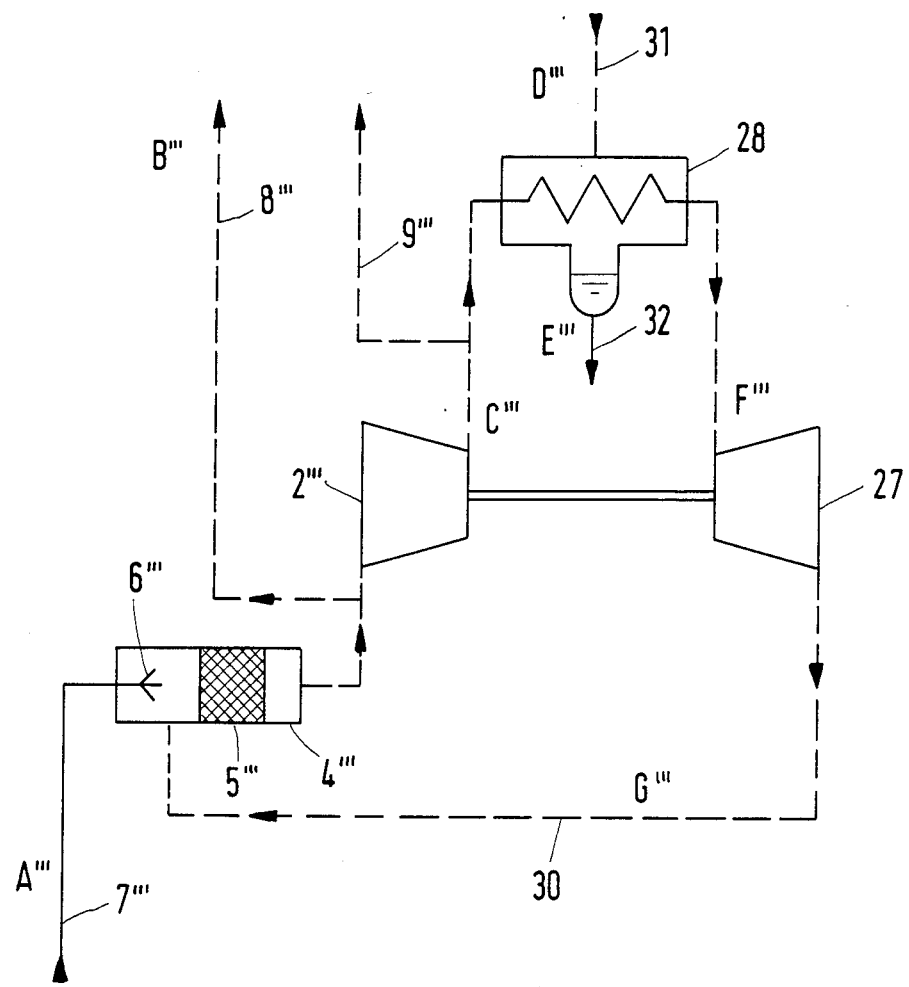
Figure 5:
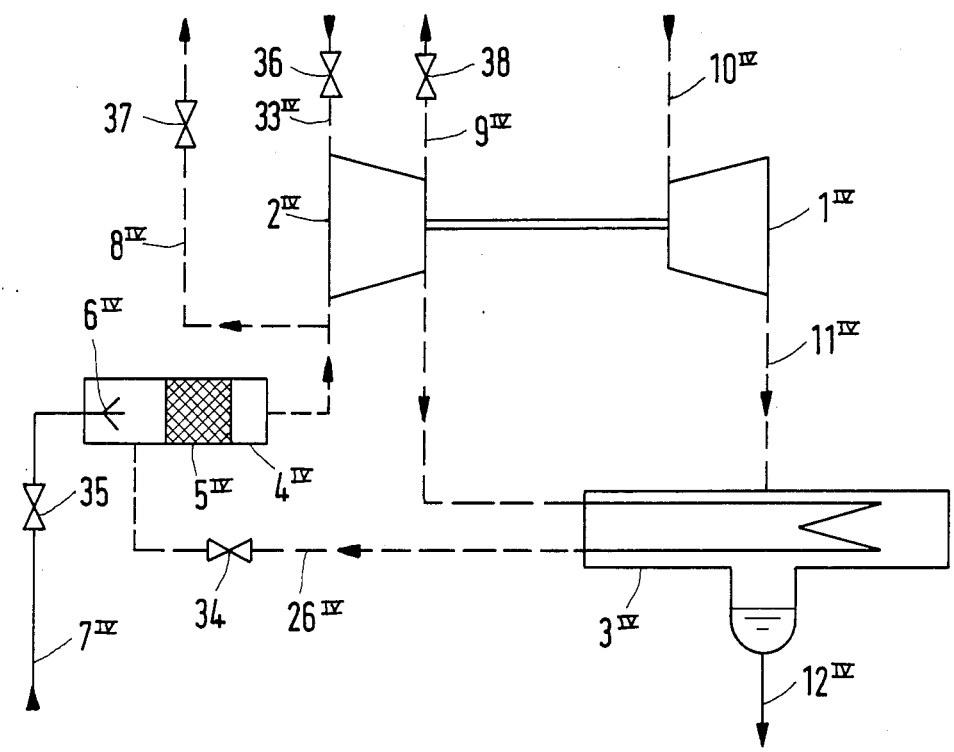
Figure 6:
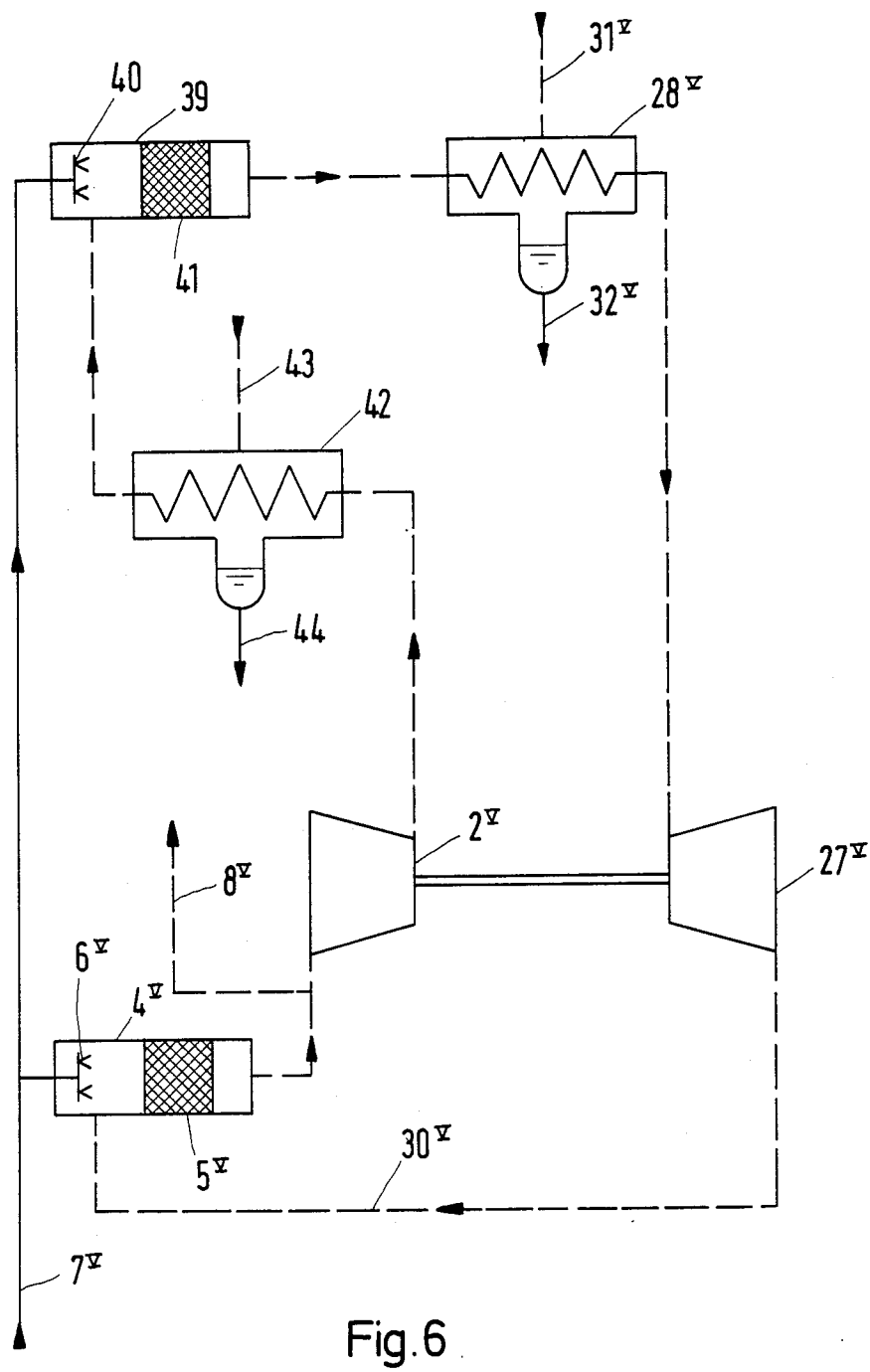

These and other objects and advantages of the invention will become more apparent from the following detailed description taken in conjunction with the accompanying drawings wherein:

FIG. 1 schematically illustrates an apparatus for vaporizing a liquified hydrocarbon in accordance with the invention;

FIG. 2 schematically illustrates a modified embodiment of an apparatus for vaporizing a liquified hydrocarbon which employs two stages for vaporization;

FIG. 3 schematically illustrates a further embodiment of a vaporization apparatus wherein a compressed flow of vaporized hydrocarbon is preheated prior to heating for re-cycling purposes in accordance with the invention;

FIG. 4 schematically illustrates a further embodiment of an apparatus wherein the flow of vaporized hydrocarbon is expanded prior to direct heat exchange with the liquified hydrocarbon;

FIG. 5 schematically illustrates an embodiment similar to FIG. 1 for selective use of the compressor in a liquified gas pipeline; and FIG. 6 schematically illustrates a further embodiment of a two stage apparatus in accordance with the invention.

Referring to FIG. 1, the apparatus for vaporizing a liquified hydrocarbon includes a heat exchanger 4 in the form of a container which is connected to a conduit 7 for delivering a flow of liquified hydrocarbon into the heat exchanger 4 and a means in the form of a conduit 26 for delivering a vaporized flow of the hydrocarbon into the heat exchanger 4. A means 5 in the form of a static mixer, such as one described in Swiss Pat. Nos. 537,208; 547,120; and 642,564 as well as European Pat. No. 70,917, is disposed within the heat exchanger 4 for mixing the delivered flows in order to vaporize the liquified hydrocarbon. As indicated, a plurality of nozzles 6 are provided at the outlet of the conduit 7 for spraying the liquified hydrocarbon into the heat exchanger 4 upstream of the mixing device 5.

The apparatus also includes a compressor 2 which is connected to the heat exchanger 4 in order to receive and compress a vaporized flow of hydrocarbon therefrom. As indicated, suitable lines 8, 9 may be located upstream and downstream of the compressor 2 in order to withdraw noncompressed or compressed hydrocarbon gas from the apparatus for use as a product in other uses.

The apparatus also includes a heating means which is connected to and between the compressor 2 and the heat exchanger 4 for heating a flow of compressed hydrocarbon from the compressor 2 for recycling to the heat exchanger 4. As indicated, the heating means includes a heat exchanger 3 which is connected to the compressor 2 in order to receive a flow of compressed hydrocarbon therefrom. In addition, a thermal machine, for example in the form of a turbine 1, such as a back pressure turbine or gas turbine, is provided for delivering a flow of heat conducting medium, for example steam, to the heat exchanger 3 for indirect heat exchange with the flow of compressed hydrocarbon therein in order to generate a vaporized flow of hydrocarbon for delivery to the conduit 26. As indicated, the turbine 1 is drivingly connected to the compressor 2. In addition, the steam turbine 1 may be supplied with a high pressure steam through a line 10 which, after expansion, is delivered through a line 11 into the heat exchanger 3. After condensing, the condensed medium may flow out through a line 12 from the heat exchanger 3.

In addition to the line 11, the heat exchanger 3 can be fed from other steam sources, for example, from another back-pressure (counter-pressure) turbine (not shown) which drives a liquified gas pump (not shown). The purpose of this liquified gas pump would consist in transporting liquid gas from storage (not shown) into the conduit 7 for delivery into the heat exchanger 4.

In operation, the flow of liquified hydrocarbon which is supplied through the nozzles 7 is heated in direct heat exchange relation with the flow of vaporized hydrocarbon delivered through the conduit 26 in order to generate a vaporized flow of hydrocarbon. This vaporized flow is then passed to the compressor 2 and at least a part of the gas is compressed therein. Thereafter, the compressed flow is heated in indirect heat exchange relation within the heat exchanger 3 in order to generate a flow of vaporized hydrocarbon. Thereafter, this flow is re-cycled through the conduit 26 into the flow of liquified hydrocarbon in the heat exchanger 4.

Of note, during passage through the mixing device 5, the liquified and vaporized flows of hydrocarbon are mixed so that liquid droplets can be eliminated prior to delivery of the flow to the compressor 2.

Referring to FIG. 2, wherein like reference characters indicate like parts as above, the heating means may be constructed so that the heated flow of vaporized hydrocarbon from the heat exchanger 3' is not delivered directly to the heat exchanger 4'. Instead, the heat exchanger 3' is connected to a further heat exchanger 16 containing a mixing device 17 so as to deliver the vaporized flow of hydrocarbon thereto. In addition, the heat exchanger 16 is connected to a branch 18 of the conduit 7' in order to receive a flow of liquified hydrocarbon, for example through nozzles 17' for vaporization therein. Again, a direct heat exchange takes place between the received liquified hydrocarbon and vaporized hydrocarbon in order to generate a flow of vaporized hydrocarbon for delivery to a second presser 13.

As above, suitable lines 23, 24 are connected upstream and downstream of the compressor 13 in order to withdraw vaporized hydrocarbon as a product. Also as above, the compressor 13 is driven by a turbine 1' to which steam is delivered via a line 20 and exhausted after expansion via a line 14 to a further heat exchanger 15.

The compressor 13 is also connected to the heat exchanger 15 in order to deliver the compressed flow of hydrocarbon to the heat exchanger 15 for indirect heat exchange with the steam delivered from the turbine 1'. After heating, the hydrocarbon is delivered via a line 22 to the conduit leading into the heat exchanger 4'.

As indicated in FIG. 2, the heat exchanger 15 is also provided with a line 21 from which condensate can be removed.

During operation, the liquified hydrocarbon is heated in the two stages provided by the heat exchangers 4', 16 which are arranged in series. Further, the compressed flows from the respective compressors 2', 13 are subsequently heated and the resultant heated flows of vaporized hydrocarbon are delivered to the alternate heat exchangers 16, 4'.

During operation, product may be withdrawn via any one of the lines 8', 9, 23, 24, or from only one stage.

While illustrated as a two-stage apparatus, the apparatus may also be constructed of several stages. Further, it is not necessary to use the combination compressor-steam turbine on all stages. Instead, use may be made of external heat sources for heating the hydrocarbon flows for vaporization purposes.

Referring to FIG. 3, wherein like reference characters indicate like parts as above, a heat exchanger 25 may be connected to and between the compressor 2" and the heat exchanger 3" for preheating the flow of compressed hydrocarbon from the compressor 2" prior to delivery to the heat exchanger 3". In this case, the condensate from the heat exchanger 3" may be delivered through the line 12" to the heat exchanger 25 as a heat exchange medium for the compressed flow.

Referring to FIG. 4, wherein like reference characters indicate like parts as above, the heating means may be constructed so that the compressor 2"' delivers the compressed flow directly to a heat exchanger 28 which is fed from an external heat source, for example a steam power generator of a ship, and thereafter delivered to a turbine 27 for expansion and subsequent delivery to a conduit 30 extending to the heat exchanger 4"'. As indicated, a heat exchange medium, such as steam, is delivered through a line 31 into the heat exchanger 22 while condensate is moved via a line 32.

During operation, the liquified hydrocarbon is sprayed through the nozzles 6"' of the conduit 7"' into the heat exchanger 4"' and broughtinto direct heat exchange with the expanded hydrocarbon fed in through the line 30 and is vaporized in the process. The hydrocarbon which is compressed in the compressor 2"' is heated in indirect relation in the heat exchanger 28 and is then delivered to the turbine 27 for expansion and subsequent re-cycling.

Referring to FIG. 5 wherein like reference characters indicate like parts as above, the apparatus is similar to that illustrated in FIG. 1. This embodiment is intended for use on dry land and for intergration with a pipeline system. In this respect, the apparatus can be used to support natural gas networks with decentralized liquid natural gas storage in order to meet local peak requirements in case of great demand and/or be available to cover the demand in case of failure of other natural gas network components. In this respect, note is made that local storage is useful only if it can rapidly supply good-sized natural gas quantities.

In the embodiment of FIG. 5, means in the form of valves 36, 38 are provided in the lines $33^{IV}$, $9^{IV}$ for selectively connecting the compressor $2^{IV}$ to a hydrocarbon gas pipeline for compressing a flow of gas therefrom. In addition, valve means 34, 35, 37 are provided in the conduits $26^{IV}$, $7^{IV}$, $8^{IV}$ for selectively connecting the heat exchanger $4^{IV}$ and heating means to the compressor $2^{IV}$.

The apparatus can be used as a pure compression station if the valves 34, 35, 37 are closed while the valves 36, 38 are opened. In this case, natural gas can be suctioned in through the valve 36 and after being compressed can be exhausted through the valve 38 into the pipeline system. With the valves 36, 38 closed and the valves 34, 35 opened, the apparatus may function as a pure vaporization apparatus.

Of note, it is possible to operate the apparatus simultaneously as a compression station and as a vaporization apparatus. In this case, the percentage contribution of the two operations can be changed very rapidly through an appropriate regulation of the valves 34, 35, 36, 38.

Referring to FIG. 6 wherein like reference characters indicate like parts as above, the apparatus may be constructed as a multi-stage installation similar to that of FIG. 2. In this embodiment, the apparatus includes a low pressure section and a high pressure section.

The low pressure section includes a compressor $2^V$, a turbine $27^V$ and a heat exchanger $4^V$ while the high pressure section contains a pair of heat exchangers 42, $28^V$ for indirect heating of the hydrocarbon flow and a heat exchanger in the form of a container 39 for direct heat exchange with a flow of liquified hydrocarbon delivered via nozzles 40. As above, the heat exchange includes a static mixer 41 and the heat exchangers 42, $28^V$ contain steam delivery lines 43, $31^V$ and condensate lines 44, $32^V$.

In operation, after expansion in the turbine $27^V$, relatively arm hydrocarbon gas such as a natural gas, is brought into direct heat exchange with liquid natural gas in the heat exchanger $4^V$. The throughput ratio of liquid natural gas to natural gas vapor is selected in such a way, that a temperature, for example, ambient temperature, is achieved suitable for obtaining the product. A portion of the vapor is withdrawn as product from line $8^V$. The remaining quantity of vapor is compressed in the compressor $2^V$ and heated in the heat exchanger 42. As a heat source, steam, waste gas of a gas turbine or warm water can, for example, be used, which is fed through the line 43 into the heat exchanger 42 and removed through the condensate line 44 after cooling. The gas heated in the heat exchanger 42 is subsequently mixed in the static mixing device 21 with liquid natural gas which is sprayed in through nozzles 40. The mixing temperatures must be sufficiently high for the mixture to behave clearly as a gas, that is, no drops must form. In this process, it is not required that ambient temperature be reached.

The mixture is heated further in the heat exchanger $28^V$ and expanded in the turbine $27^V$. The heat source for the heat exchanger $28^V$ can be, for example, steam, waste gas of a gas turbine or warm water, which is fed to the heat exchanger $28^V$ can be exhausted via the line $32^V$.

Even with relatively low pressures in the compressor $2^V$ and turbine $27^V$ (allowing single stage construction), relatively large pressure drops can be obtained in the container 39 and in the heat exchangers 42 and $28^V$. This, in turn, permits construction of relatively small containers and heat exchangers, a fact of particular advantage on board ships.

The invention comprises all possible combinations of the represented embodiments.

The following examples are given for installations according to FIG. 1, FIG. 2, and FIG. 4 for natural gas facilities.

|   | Temp. °C. | Pressure bar | Throughput t/d (tons/day) |   |
|---|---|---|---|---|
|   | Example for an Installation According to FIG. 1 ||||
| A  | −156 | 80 | 3000 | liquid gas |
| B  | 20   | 70 | 3000 | gas |
| C  | 34   | 82 | 9084 | gas |
| D  | 350  | 60 | 956  | vapor |
| E  | 144  | 4  | 956  | vapor |
| F  | 97   | 75 | 9084 | gas |
|   | Example for an Installation According to FIG. 2 ||||
| A' | −156 | 90 | 10000 | liquid gas |
| B' | −156 | 90 | 5874  | liquid gas |
| C' | −156 | 90 | 4126  | liquid gas |
| D' | 20   | 80 | 10000 | gas |
| E' | 21   | 91 | 14662 | gas |
| F' | 127  | 88 | 14662 | gas |
| G' | 20   | 85 | 20536 | gas |
| H' | 127  | 82 | 10536 | gas |
| I' | 350  | 55 | 2300  | vapor |
| J' | 180  | 10 | 1338  | condensation product |
| K' | 180  | 10 | 962   | vapor |
| L' | 180  | 10 | 962   | condensation product |

The numerical example for an installation according to FIG. 2 refers to a special design, in which natural gas product is supplied only through line 8'', and the compressor 2' and turbine 1' are not present. This divides the throughput G' into two throughputs D' and H': D' is withdrawn as product and H' is heated in 3'. Only turbine 14 is fed with vapor, corresponding to J'. Part of the counter pressure vapor, present at the outlet of the turbine 14, is condensed in the heat exchanger 15 (corresponding to the throughput J'), and another part is fed to the heat exchanger 3' as heat source (corresponding to K') and is carried off as condensated product (corresponding to L').

| Numerical Example for an Installation According to FIG. 4 ||||
|---|---|---|---|
|   | Temp. °C. | Pressure bar | Throughput t/d (tons/day) |
| A''' | −156  | 50   | 3000 liquid gas |
| B''' | 20    | 35   | 3000 gas |
| C''' | 68.4  | 61.5 | 6077 gas |
| D''' | 276   | 60   | 1590 vapor |
| E''' | 276   | 60   | 1590 condensation product |
| F''' | 220   | 60   | 6077 gas |
| G''' | 176.6 | 36   | 6077 gas |

The invention thus provides a relatively simple compact apparatus which can be used to economically vaporize a liquified hydrocarbon.

Further, the invention provides a cost-efficient process for the vaporization of a liquified hydrocarbon.

The apparatus can be used on board a ship such as a liquid natural gas tanker or on a diesel-powered ship in an efficient manner.

Further, the invention provides an apparatus and process which is particularly suitable for steam ships having storage space for liquified hydrocarbon since, in this case, the steam from the steam generator of the ship can be used as a heat source.

What is claimed is:

1. An apparatus for vaporizing a liquified hydrocarbon, said apparatus comprising
a first heat exchanger;
a conduit for delivering a flow of liquified hydrocarbon into said heat exchanger;
first means for delivering a vaporized flow of the hydrocarbon into said heat exchanger;
second means in said heat exchanger for mixing the delivered flows of liquified hydrocarbon and vaporized hydrocarbon to vaporize the liquified hydrocarbon;
a compressor connected to said heat exchanger to receive and compress a vaporized flow of hydrocarbon therefrom; and
heating means connected to and between said compressor and said first heat exchanger for heating a flow of compressed hydrocarbon from said compressor for recycling to said first heat exchanger.

2. An apparatus as set forth in claim 1 wherein said heating means includes a second heat exchanger for receiving a flow of compressed hydrocarbon from said compressor and a thermal machine for delivering a flow of heat conducting medium to said second heat exchanger for indirect heat exchange with the flow of compressed hydrocarbon to generate a vaporized flow of hydrocarbon.

3. An apparatus as set forth in claim 2 wherein said second heat exchanger is connected to said first means to deliver the vaporized flow of hydrocarbon thereto.

4. An apparatus as set forth in claim 2 wherein said heating means further includes a third heat exchanger connected to said second heat exchanger to receive the vaporized flow of hydrocarbon and connected to said conduit to receive a flow of liquified hydrocarbon for vaporization therein, a second compressor connected to said third heat exchanger for receiving and compressing a flow of vaporized hydrocarbon from said third heat exchanger and a fourth heat exchanger connected to and between said second compressor and said first means for heating and delivering a flow of vaporized hydrocarbon to said first means.

5. An apparatus as set forth in claim 2 wherein said heating means includes a third heat exchanger between said compressor and said second heat exchanger for preheating a flow of compressed hydrocarbon from said compressor prior to delivery to said second heat exchanger.

6. An apparatus as set forth in claim 1 wherein said heating means includes a second heat exchanger for receiving and heating a flow of compressed hydrocarbon from said compressor and a turbine downstream of said second heat exchanger for expanding the flow of hydrocarbon for delivery to said first means.

7. An apparatus as set forth in claim 1 which further includes means for selectively connecting said compressor to a hydrocarbon gas pipeline for compressing a flow of gas therefrom and valve means for selectively connecting said first heat exchanger and said heating means to said compressor.

8. An apparatus as set forth in claim 1 wherein said heating means includes a second heat exchanger connected to said compressor for receiving and vaporizing a flow of compressed hydrocarbon therefrom, a third heat exchanger connected to said second heat exchanger to receive the flow of vaporized hydrocarbon therefrom and to said conduit to receive liquified hydrocarbon therefrom in heat exchange with the vaporized hydrocarbon; a fourth heat exchanger connected to said third heat exchanger to heat a flow of vaporized hydrocarbon therefrom and a turbine connected to and between said fourth heat exchanger and said first means for expanding the flow of vaporized hydrocarbon.

9. An apparatus as set forth in claim 1 wherein said heating means includes a back pressure turbine drivingly connected to said compressor.

10. An apparatus as set forth in claim 1 wherein said heating means includes a gas turbine drivingly connected to said compressor.

11. An apparatus as set forth in claim 1 wherein said second means includes at least one static mixer.

12. A process for vaporizing a liquified hydrocarbon, said process comprising the steps of heating a flow of liquified hydrocarbon with a flow of vaporized hydrocarbon in direct heat exchange relation to generate a vaporized-flow of hydrocarbon;

compressing at least a part of the vaporized flow of hydrocarbon;

heating the compressed flow of hydrocarbon in an indirect heat exchange relation to generate a flow of vaporized hydrocarbon; and thereafter re-cycling the indirectly heated flow of vaporized hydrocarbon into the flow of liquified hydrocarbon.

13. A process as set forth in claim 12 which further comprises the step of withdrawing a second part of the vaporized flow of hydrocarbon prior to compressing.

14. A process as set forth in claim 12 which further comprises the step of withdrawing a part of the compressed flow of hydrocarbon prior to heating.

15. A process as set forth in claim 12 wherein the flow of liquified hydrocarbon is heated in at least two stages arranged in series in direct heat exchange relation with a flow of vaporized hydrocarbon.

16. A process as set forth in claim 15 which further comprises the step of compressing a flow of vaporized hydrocarbon from one of said stages prior to heating thereof.

17. A process as set forth in claim 12 which further comprises the step of preheating the compressed flow of hydrocarbon prior to said step of heating in heat exchange relation with a flow of waste heat from the indirect heat exchange.

18. A process as set forth in claim 12 which further comprises the step of expanding the heated flow of vaporized hydrocarbon prior to re-cycling.

19. A process as set forth in claim 18 which further comprises the steps of bringing the compressed flow of hydrocarbon into direct heat exchange with a second flow of liquified hydrocarbon and thereafter heating the generated vaporized hydrocarbon in an indirect heat exchange prior to said step of expanding.

* * * * *